United States Patent
Liu et al.

(10) Patent No.: US 11,488,283 B1
(45) Date of Patent: Nov. 1, 2022

(54) POINT CLOUD RECONSTRUCTION METHOD AND APPARATUS BASED ON PYRAMID TRANSFORMER, DEVICE, AND MEDIUM

(71) Applicant: HUAZHONG UNIVERSITY OF SCIENCE AND TECHNOLOGY, Hubei (CN)

(72) Inventors: Qiong Liu, Hubei (CN); Jun Zhang, Hubei (CN); You Yang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/739,166

(22) Filed: May 9, 2022

(30) Foreign Application Priority Data

Nov. 30, 2021 (CN) .......................... 202111444030.8

(51) Int. Cl.
*G06T 3/40* (2006.01)
*G06N 3/04* (2006.01)
*G06T 9/00* (2006.01)

(52) U.S. Cl.
CPC ......... *G06T 3/4046* (2013.01); *G06N 3/0454* (2013.01); *G06T 9/001* (2013.01); *G06T 9/002* (2013.01)

(58) Field of Classification Search
CPC ....... G06T 3/4046; G06T 9/001; G06T 9/002; G06N 3/0454
See application file for complete search history.

(56) References Cited

U.S. PATENT DOCUMENTS

| | | | | |
|---|---|---|---|---|
| 11,399,531 | B1* | 8/2022 | Sibley | G05B 15/02 |
| 11,423,567 | B2* | 8/2022 | Lemley | G06V 40/165 |
| 2021/0156963 | A1* | 5/2021 | Popov | G06N 3/08 |
| 2021/0358137 | A1* | 11/2021 | Lee | G06T 3/0093 |

FOREIGN PATENT DOCUMENTS

| | | | |
|---|---|---|---|
| CN | 113205579 | | 8/2021 |
| CN | 114693873 A | * | 7/2022 |

OTHER PUBLICATIONS

Lin, Tsung-Yi, et al. "Feature pyramid networks for object detection." Proceedings of the IEEE conference on computer vision and pattern recognition. 2017. (Year: 2017).*

* cited by examiner

*Primary Examiner* — Charles T Shedrick
(74) *Attorney, Agent, or Firm* — JCIPRNET

(57) ABSTRACT

A point cloud reconstruction method and apparatus based on a pyramid transformer, a device, and a medium are provided. The method includes: after obtaining point feature data corresponding to each view, inputting the point feature data into a dual-channel pyramid network; when passing through a first channel, inputting an updated output of an attention mechanism of each layer to a next layer, when passing through a second channel, splicing and inputting the updated output of the attention mechanism of each layer and the updated output of the attention mechanism of a corresponding layer of the first channel in a same layer as the next layer to the next layer; converting the updated output of the attention mechanism of a bottommost layer of the second channel into point cloud coordinates to obtain a point cloud result, and taking an intersection of the point cloud result to characterize a target object.

9 Claims, 3 Drawing Sheets

POINT CLOUD RECONSTRUCTION METHOD AND APPARATUS BASED ON PYRAMID TRANSFORMER, DEVICE, AND MEDIUM

CROSS-REFERENCE TO RELATED APPLICATION

This application claims the priority benefit of China application serial no. 202111444030.8, filed on Nov. 30, 2021. The entirety of the above-mentioned patent application is hereby incorporated by reference herein and made a part of this specification.

BACKGROUND

Technical Field

The disclosure relates to the field of computer vision, and more particularly relates to a point cloud reconstruction method and apparatus based on a pyramid transformer, a device, and a medium.

Description of Related Art

The multi-view stereoscopic three-dimensional reconstruction technology reconstructs a three-dimensional object using multiple input images from different perspectives. Such technology studies how to obtain three-dimensional information of an object in space through two-dimensional information of an image, and finally obtains a spatial three-dimensional model of the object. The traditional three-dimensional reconstruction technology estimates camera parameters corresponding to each image through inputting multiple images from different view, and then re-projects objects on different pixels in the images onto a three-dimensional space, thereby reconstructing the three-dimensional structure of the object. However, the traditional method requires more input images, and the reconstruction performance of reflective objects and objects with less texture is poor.

In recent years, with the continuous development of deep learning, more and more researches are carried out based on deep learning. Deep learning trains a network through inputting a large number of images and corresponding three-dimensional structures, so that the network can adaptively extract information in the images and distinguish between different object shapes. Compared with the traditional method, the deep learning method requires fewer input images and can achieve better performance. However, applying deep learning to three-dimensional reconstruction is not as simple as one might think. Unlike images or videos that are ordered and regularly arranged, many three-dimensional representations, such as a polygon mesh and a point cloud, are irregular or disordered. Therefore, the network structures applied in the two-dimensional domain are not necessarily guaranteed to be equally applicable in the three-dimensional domain.

A three-dimensional reconstruction method and apparatus, a device, and a storage medium are disclosed in Chinese Patent No. CN113205579A. Such method fully considers features within each view and between the views to effectively improve the precision of a reconstruction result using the complementarity and consistency of the views. However, such method only considers local features of a single scale, and the reconstruction precision of object surface details is relatively low.

SUMMARY

The disclosure provides a point cloud reconstruction method and apparatus based on a pyramid transformer, a device, and a medium, which aim to solve the technical issue of relatively low reconstruction precision of object surface details in three-dimensional reconstruction.

In order to achieve the above objective, in a first aspect, the disclosure provides a point cloud reconstruction method based on a pyramid transformer, which includes the following.

Multiple views of a target object from different perspectives are obtained, and each view is processed to obtain corresponding point feature data. The point feature data is input into a pyramid network, where the pyramid network includes a first channel from bottom to top and a second channel from top to bottom, specifically the first channel and the second channel have the same number of layers, and the number of sampling points in the same layer is the same. An input point feature of each layer is sampled, a point feature of an invisible part of a current view is then updated using point features of visible parts of other views based on a sampled point feature of each view, and correlation between updated point features in each view is obtained using a transformer to obtain an updated output of an attention mechanism. When the point feature data passes through the first channel, the updated output of the attention mechanism of each layer is input to the next layer until the updated output of the attention mechanism of the topmost layer of the first channel is input to the topmost layer of the second channel. When the point feature data passes through the second channel, the updated output of the attention mechanism of each layer and the updated output of the attention mechanism of the corresponding layer of the first channel that is in the same layer as the next layer are spliced and input to the next layer. The updated output of the attention mechanism of the bottommost layer of the second channel is converted into point cloud coordinates to obtain a point cloud result of each view, and an intersection of the point cloud result of each view is taken to characterize a target object after point cloud reconstruction.

Further, the processing of each view to obtain the corresponding point feature data includes the following.

Image coding is performed on each view according to a neural network algorithm to obtain a feature map corresponding to each view. Local feature data of each view is determined according to a preset camera intrinsic parameter matrix and a preset random point cloud of each view. The preset random point cloud is processed according to the neural network algorithm to obtain global feature data of each view. The local feature data and the global feature data of each view are spliced to obtain the point feature data of each view.

Further, the determining of the local feature data of each view according to the preset camera intrinsic parameter matrix and the preset random point cloud of each view includes the following.

The preset random point cloud of each view is projected onto the corresponding feature map according to the preset camera intrinsic parameter matrix to obtain coordinate data of the preset random point cloud on the corresponding feature map. A feature formed by the coordinate data on the corresponding feature map is determined as the local feature data of each view.

Further, the processing of the preset random point cloud according to the neural network algorithm to obtain the global feature data of each view includes the following.

The preset random point cloud is processed through the neural network algorithm to obtain an initial feature point corresponding to the preset random point cloud. A mean and a variance of the initial feature point are converted into a mean and a variance of each corresponding feature map. The mean and the variance of the feature map are determined as the corresponding global feature data of each view.

Further, the sampling of the input point feature includes adaptively sampling the input point feature through learning a weighted matrix.

Further, before converting the updated output of the attention mechanism of the bottommost layer of the second channel into the point cloud coordinates, the point cloud reconstruction method further includes the following.

The updated output of the attention mechanism of each layer of the second channel is converted into the point cloud coordinates to obtain a point cloud reconstruction result of the corresponding layer. Parameter adjustment is performed on each layer of the second channel based on a loss function of the corresponding layer, and the updated output of an optimized attention mechanism of each layer of the second channel is obtained. After the updated output of the optimized attention mechanism of each layer of the second channel and the updated output of the attention mechanism of the corresponding layer of the first channel that is in the same layer as the next layer are spliced and input to the next layer, the updated output of the optimized attention mechanism of the next layer of the second channel is obtained until the updated output of the optimized attention mechanism of the bottommost layer of the second channel is obtained.

In a second aspect, the disclosure provides a point cloud reconstruction apparatus based on a pyramid transformer, which includes the following.

A point feature obtaining module is used to perform the following. Multiple views of a target object from different perspectives are obtained, and each view is processed to obtain corresponding point feature data. A point feature updating module is used to perform the following. The point feature data is input into a pyramid network, where the pyramid network includes a first channel from bottom to top and a second channel from top to bottom, specifically the first channel and the second channel have the same number of layers, and the number of sampling points in the same layer is the same. An input point feature of each layer is sampled, a point feature of an invisible part of a current view is then updated using point features of visible parts of other views based on a sampled point feature of each view, and correlation between updated point features in each view is obtained using a transformer to obtain an updated output of an attention mechanism. When the point feature data passes through the first channel, the updated output of the attention mechanism of each layer is input to the next layer until the updated output of the attention mechanism of the topmost layer of the first channel is input to the topmost layer of the second channel. When the point feature data passes through the second channel, the updated output of the attention mechanism of each layer and the updated output of the attention mechanism of the corresponding layer of the first channel that is in the same layer as the next layer are spliced and input to the next layer. A point cloud reconstruction module is used to perform the following. The updated output of the attention mechanism of the bottommost layer of the second channel is converted into point cloud coordinates to obtain a point cloud result of each view, and an intersection of the point cloud result of each view is taken to characterize a target object after point cloud reconstruction.

In a third aspect, the disclosure provides an electronic device, which includes a memory and at least one processor. The memory stores a computer executable command. The at least one processor executes the computer executable command stored in the memory, so that the at least one processor executes the point cloud reconstruction method according to the first aspect.

In a fourth aspect, the disclosure provides a computer-readable storage medium. The computer-readable storage medium stores a computer executable command. When the processor executes the computer executable command, the point cloud reconstruction method according to the first aspect is implemented.

In general, through the above technical solutions conceived by the disclosure, the following beneficial effects can be achieved.

(1) In the disclosure, after obtaining the point feature data corresponding to each view, the point feature data is input to the dual-channel pyramid network. An input point feature of each layer is sampled, correspondingly a point feature of an invisible part of a current view is then updated using point features of visible parts of other views based on a sampled point feature of each view, and correlation between updated point features in each view is obtained using a transformer to obtain an updated output of an attention mechanism. Further, when the point feature data passes through the first channel, the updated output of the attention mechanism of each layer is input to the next layer until the updated output of the attention mechanism of the topmost layer of the first channel is input to the topmost layer of the second channel. When the point feature data passes through the second channel, the updated output of the attention mechanism of each layer and the updated output of the attention mechanism of the corresponding layer of the first channel that is in the same layer as the next layer are spliced and input to the next layer. The updated output of the attention mechanism of the bottommost layer of the second channel is converted into point cloud coordinates to obtain a point cloud result of each view, and an intersection of the point cloud result of each view is taken to characterize a target object after point cloud reconstruction. In this way, the disclosure may consider the reconstruction of aspects, such as detail parts, fine parts, and holes, of the surface of the object, so that the three-dimensional reconstruction precision is higher.

(2) The disclosure adaptively samples the input point feature through learning the weighted matrix. Because each parameter in the weighted matrix considers the correlation between points, the sampling is more efficient and accurate.

(3) The disclosure sequentially optimizes the network parameter of each layer of the second channel of the pyramid network through the loss function, so that the updated output of the attention mechanism fed back to the next layer by each layer is effective, thereby further improving the three-dimensional reconstruction precision.

DETAILED DESCRIPTION OF DISCLOSED EMBODIMENTS

In order for the objectives, technical solutions, and advantages of the disclosure to be clearer, the disclosure will be further described in detail below with reference to the drawings and embodiments. It should be understood that the specific embodiments described herein are only used to explain the disclosure, but not to limit the disclosure. In addition, the technical features involved in the various embodiments of the disclosure described below may be combined with each other as long as there is no conflict.

In the disclosure, terms such as "first" and "second" (if any) in the disclosure and the drawings are used to distinguish between similar objects and are not necessarily used to describe a specific order or sequence.

Embodiment 1

Figure 1:
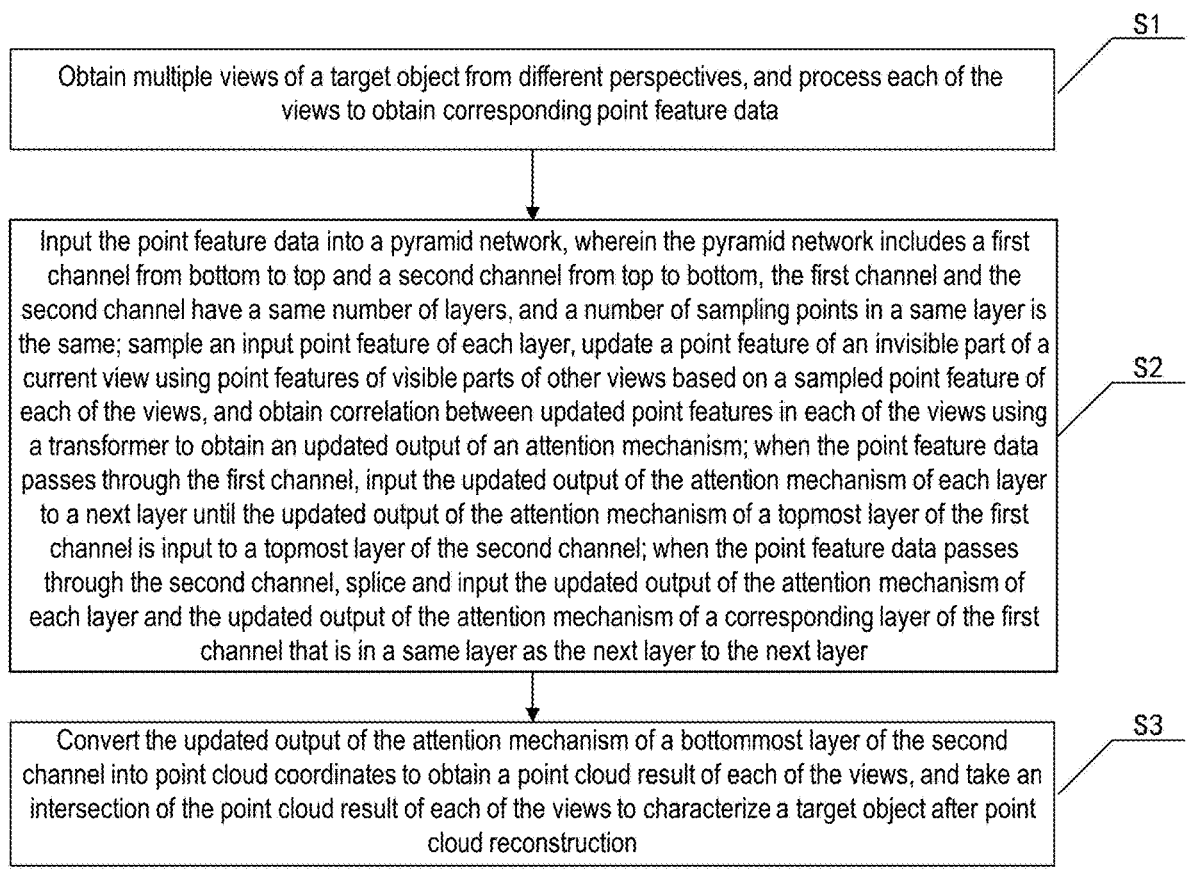
FIG. 1 is a schematic flowchart of a point cloud reconstruction method based on a pyramid transformer according to an embodiment of the disclosure.
Figure 2:
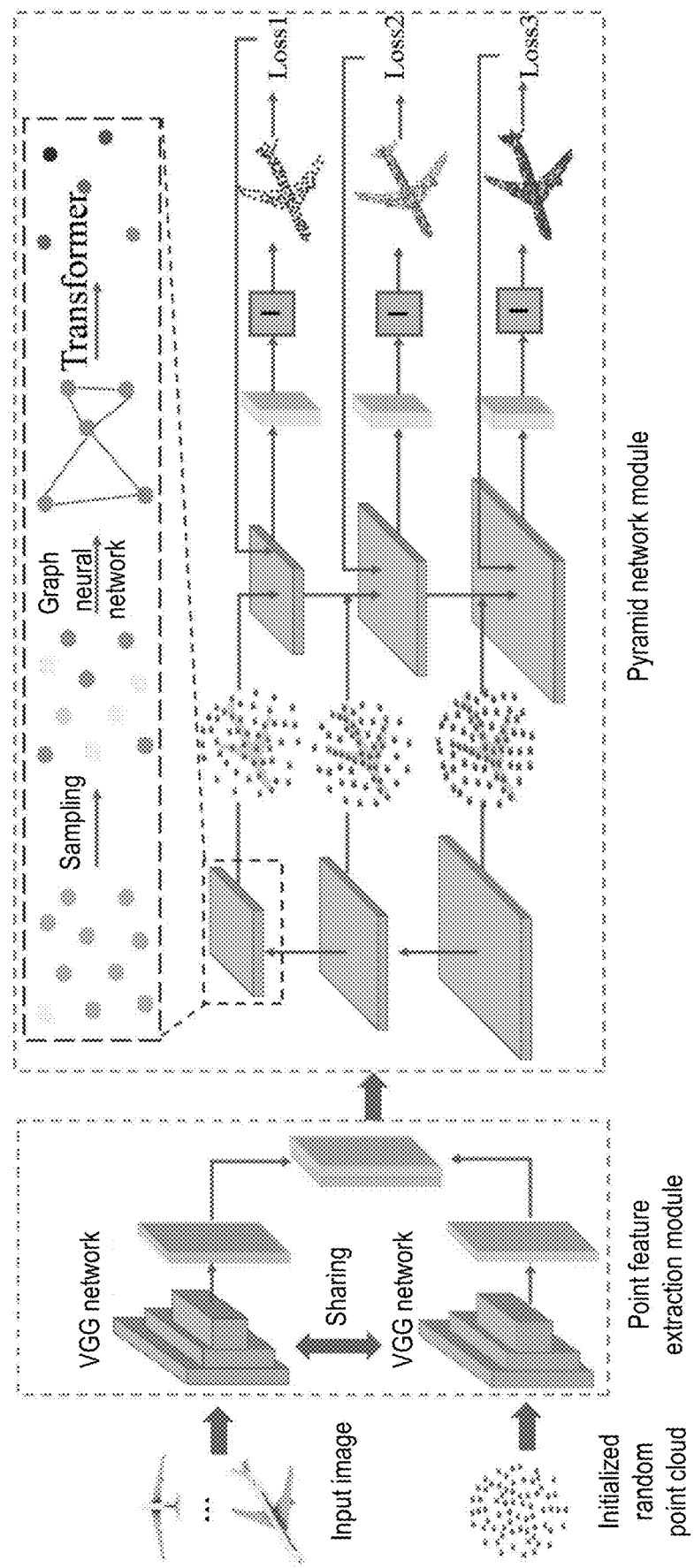
FIG. 2 is a schematic diagram of an overall network structure of a point cloud reconstruction method based on a pyramid transformer according to an embodiment of the disclosure.

Referring to FIG. 1 in conjunction with FIG. 2, an embodiment of the disclosure provides a point cloud reconstruction method based on a pyramid transformer, which includes the following.

In Step S1, multiple views of a target object from different perspectives are obtained, and each view is processed to obtain corresponding point feature data.

In the embodiment, in order to obtain more accurate point features, multi-scale global and local information is extracted from an input image. For a local feature of a point, the disclosure encodes the input image using a VGG16 network, and outputs results of different deep convolutional neural networks to obtain multi-scale feature maps. After obtaining the feature maps of the two-dimensional images, an initialized random point cloud is projected onto the feature map using a camera intrinsic matrix to obtain coordinates of each point on the feature map. The feature corresponding to the coordinates on the feature map is the local feature of the point. In this way, the camera matrix of the camera is encoded into the network, which helps the network to better learn geometric information of an object. For a global feature of a point, the initialized random point cloud is first input into multiple multilayer perceptrons (MLP) to obtain a feature of an initial point. Then, the mean and the variance of the feature of the initial point are converted into the mean and the variance of the feature map, thereby obtaining the global feature of the point. Finally, the global feature and the local feature of the point are spliced together to obtain the corresponding point feature data.

In Step S2, the point feature data is input into a pyramid network, where the pyramid network includes a first channel from bottom to top and a second channel from top to bottom, specifically the first channel and the second channel have the same number of layers, and the number of sampling points in the same layer is the same. An input point feature of each layer is sampled, correspondingly a point feature of an invisible part of a current view is then updated using point features of visible parts of other views based on a sampled point feature of each view, and correlation between updated point features in each view is obtained using a transformer to obtain an updated output of an attention mechanism. When the point feature data passes through the first channel, the updated output of the attention mechanism of each layer is input to the next layer until the updated output of the attention mechanism of the topmost layer of the first channel is input to the topmost layer of the second channel. When the point feature data passes through the second channel, the updated output of the attention mechanism of each layer and the updated output of the attention mechanism of the corresponding layer of the first channel that is in the same layer as the next layer are spliced and input to the next layer.

In the embodiment, the pyramid network structure aims to fuse low-level high-precision geometric features and high-level high-precision characterization features, thereby extracting more abundant point features. As shown in FIG. 2, the disclosure adopts a dual-channel structure from bottom to top and from top to bottom, and the pyramid structure is designed by adopting a skip connection between the same level. For each layer of the pyramid, there is an SGT (Sampling Graph Transformer) unit to transform and update the point features, and including three modules, sampling, graph neural network, and transformer. The number of points after sampling in each layer is different, and different number of point cloud results is reconstructed in each layer. In the embodiment, the pyramid is set to 3 layers, and the sampling number of each layer is respectively 2048, 1024, and 512. The sampling number of points is decreased layer by layer from bottom to top, and the sampling number of points is increased layer by layer from top to bottom. The number of points in the same layer is the same in both directions. Downsampling the point cloud enables spatial information and overall shape information of the points to be clearer, and upsampling the point cloud enables the filling of details to be more specific. At the same time, with the deepening of the network, semantic information of high-level point features is more abundant, and the low-level geometric information is more accurate. Through fusing such features at different levels and number of points, the final point feature has sufficiently accurate point features to achieve higher-precision reconstruction.

Specifically, each layer of the SGT unit includes three modules, sampling, graph neural network, and transformer.

(1) Sampling

The disclosure adopts an adaptive sampling manner, which fully considers the point-to-point internal correlation. Let the point feature under each perspective be $F \subseteq R^{N_1 \times D_1}$, where $N_1$ is the number of input points and $Di$ is the input point feature. In order to consider the correlation between points, let the network learn a weight parameter matrix, $W \subseteq R^{N_2 \times N_1}$, where $N_2$ is the number of samples (if $N_1 > N_2$, the conversion is downsampling, and if $N_1 < N_2$, the conversion is upsampling). Let $F_s$ be the sampled point feature set. The sampling process may be defined as:

$$f_i^{(s)} = \left( \sum_{f_k \in F} w_{ik} f_k \right) W_1 + b_1$$

where $f_i^{(s)}$ is the i-th point feature vector in $F_s$, $f_k$ is the k-th point feature of f, $w_{ik}$ is the weight of a weight parameter matrix W, $W_1 \subseteq R^{D_1 \times D_1}$, and $b_1 \subseteq R^{D_1}$ is the weight and the bias of a one-dimensional convolutional layer. Each parameter of W considers the correlation between points. Each point can convey more or less information, more distant points can convey less information, and closer points can convey more information. Therefore, $F_s$ is sampled based on the correlation between points, which is more efficient and accurate.

(2) Graph Neural Network

Unlike a two-dimensional image, the point cloud is disordered and irregular, and general network models are not suitable for the point cloud. The graph neural network considers the connection between points and is more suitable for irregular characterization. The graph neural network is used to aggregate local point features while using the complementarity of different views to update the point features. A graph network needs to define nodes and edges to convey information. In the disclosure, the point features are chosen as the nodes of the graph. In order to learn the local features and complementary features on other views to update visible and invisible parts under each view, each node in the graph is connected to nearest k nodes of each view to serve as the edges of the graph, thereby defining the nodes and the edges of the graph neural network. In order to update the adjacent nodes, an attention mechanism is adopted to dynamically assign a weight to each edge. Specifically, let $N_i$ be the adjacent edge of a node i, j be a certain node in the adjacent edge, $f_i^{(s)}$ and $f_j^{(s)}$ be the point features after sampling, and $g_i$ be the feature after the current node is updated. The specific process is defined as:

$$\beta_{ij} = \text{softmax}(W_a(Wf_i^{(s)} \| Wf_j^{(s)}))$$

$$g_i = \delta\left(\sum_{j \in N_i} \beta_{ij} Wf_j^{(s)}\right)$$

where $\beta_{ij}$ is the weight of each edge, the greater the relationship between connected points, the greater the weight, and the smaller the relationship between connected points, the smaller the weight, and is a parameter that may be learned; $W_a$ is a convolutional network layer parameter and represents a non-linear transformation; W is used to increase the dimension of a point feature, $\|$ is used to represent the splicing of two features, a $\delta(\ )$ function represents an activation function, and a leakyReLU function is chosen in the disclosure. First the feature of a current node and the feature of an adjacent node are spliced, then the feature is mapped and normalized to the weight of an adjacent edge using Wa, and finally the feature of the current node is updated with the weight of each adjacent edge. Since the weight is a dynamic learning process, the features may be updated by adaptively considering the correlation between the points.

(3) Transformer

The transformer is designed for sequence modeling tasks and is known for the use of attention to model long-term dependencies (for example, word sequences) in data. While the point cloud is similar to word in sequence, the correlation between individual points is complex and difficult to model. However, the transformer is suitable for modeling the global relationship between points. Inspired by this, the transformer architecture is used in the SGT unit. Also, in the disclosure, raw location encoding and input embedding are incorporated into a point feature extraction module, which may generate distinguishable features since each point has unique coordinates representing the spatial location thereof. Let Q, $K \in R^{N_2 * d_a}$ and $V \in R^{N_2 * d_e}$, where Q, K, and V are respectively query, key, and value matrices, and G represents the point feature after passing through the graph neural network. The specific conversion process is as follows:

$$(Q, K, V) = G(W_q, W_k, W_v)$$

where $W_q, W_k \in R^{d_e * d_a}$, $W_v \in R^{d_e * d_e}$ share a learnable linear transformation, $d_a$ is the dimension of query and key vectors, and $d_e$ is the dimension of a value vector. In order to save computing resources, $d_a$ is set to $d_e/4$ in the disclosure. Then, the query and key matrices are used to obtain an attention weight matrix:

$$\tilde{A} = \tilde{\alpha}_{ij} = Q \cdot K^T$$

Then, the same is normalized to $A = \alpha_{ij}$:

$$\bar{\alpha}_{ij} = \frac{\tilde{\alpha}_{ij}}{\sqrt{d_a}}$$

$$\alpha_{ij} = \text{softmax}(\bar{\alpha}_{ij}) = \frac{\exp(\bar{\alpha}_{ij})}{\sum_{k=1}^{j} \exp(\bar{\alpha}_{ik})}$$

where $\tilde{\alpha}_{ij}$ is the output parameter of a self-attention layer, represents the degree of correlation between features, and characterizes a global feature relationship; $\bar{\alpha}_{ij}$ represents the result of normalizing $\tilde{\alpha}_{ij}$ according to the dimension $d_a$; $\alpha_{ij}$ represents the result of performing softmax normalization on $\bar{\alpha}_{ij}$; and $\bar{\alpha}_{ik}$ represents the k-th element of $\bar{\alpha}_{ij}$.

An output $F_{sa}$ after updating a self-attention weight is $F_{sa} = A \cdot V$. In order to obtain the final output, a similar skip connection is adopted to add up $F_{sa}$ and an input feature G to obtain the final output, $F_{out} = F_{sa} + G$.

In the disclosure, the point feature of each view input to the pyramid network module is $F \in R^{2048*128}$, which represents that 2048 points are input for each view, and the feature dimension of each point is 128. From bottom to top, the features are respectively transformed into $F_{down1024} \in R^{1024*158}$ and $F_{down512} \in R^{512*128}$ after passing through each layer. Then, from top to bottom, the features are respectively transformed into $F_{up1024} \in R^{1024*128}$ and $F_{up2048} \in R^{2048*128}$ after passing through each layer. Then, the features of the same dimension of each layer are connected, and the point features of each layer pass through a one-dimensional convolutional layer with an output dimension of 3 to obtain the point cloud output of each layer.

In Step S3, the updated output of the attention mechanism of the bottommost layer of the second channel is converted into point cloud coordinates to obtain a point cloud result of each view, and an intersection of the point cloud result of each view is taken to characterize a target object after point cloud reconstruction.

Further, before executing Step S3, the disclosure may also optimize the network parameter of each layer of the second channel of the pyramid network through the loss function, so that the updated output of the attention mechanism fed back to the next layer by each layer is effective, thereby further improving the three-dimensional reconstruction precision. Specifically, the updated output of the attention mechanism of each layer of the second channel is converted into the point cloud coordinates to obtain a point cloud reconstruction result of the corresponding layer. Parameter adjustment is performed on each layer of the second channel based on the loss function of the corresponding layer, and the updated output of an optimized attention mechanism of each layer of the second channel is obtained. After the updated output of the optimized attention mechanism of each layer of the second channel and the updated output of the attention mechanism of the corresponding layer of the first channel that is in the same layer as the next layer are spliced and input to the next layer, the updated output of the optimized attention mechanism of the next layer of the second channel is obtained until the updated output of the optimized attention mechanism of the bottommost layer of the second channel is obtained.

Embodiment 2

Figure 3:
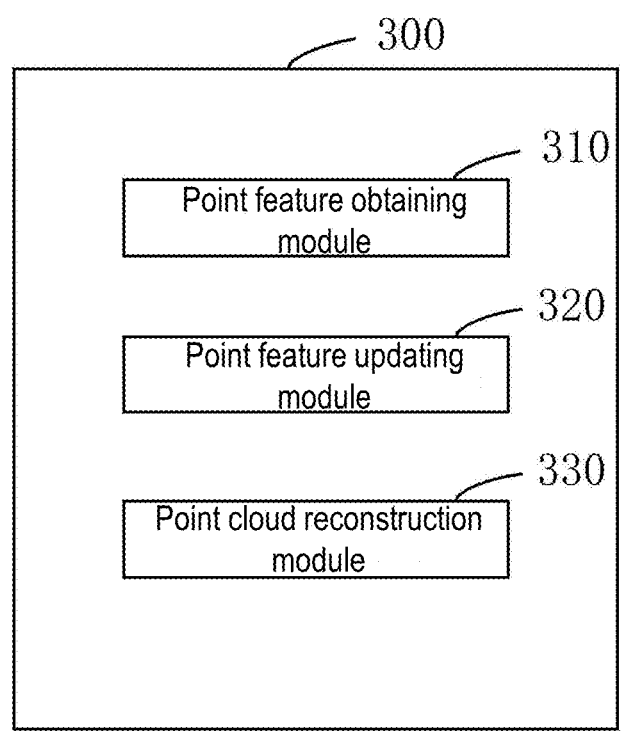
FIG. 3 is a structural block diagram of a point cloud reconstruction apparatus based on a pyramid transformer according to an embodiment of the disclosure.

Referring to FIG. 3, the disclosure provides a point cloud reconstruction apparatus 300 based on a pyramid transformer according to an embodiment of the disclosure. The apparatus 300 includes the following.

A point feature obtaining module 310 is used to perform the following. Multiple views of a target object from different perspectives are obtained, and each view is processed to obtain corresponding point feature data.

A point feature updating module 320 is used to perform the following. The point feature data is input into a pyramid network, where the pyramid network includes a first channel from bottom to top and a second channel from top to bottom, specifically the first channel and the second channel have the same number of layers, and the number of sampling points in the same layer is the same. An input point feature of each layer is sampled, correspondingly a point feature of an invisible part of a current view is then updated using point features of visible parts of other views based on a sampled point feature of each view, and correlation between updated point features in each view is obtained using a transformer to obtain an updated output of an attention mechanism. When the point feature data passes through the first channel, the updated output of the attention mechanism of each layer is input to the next layer until the updated output of the attention mechanism of the topmost layer of the first channel is input to the topmost layer of the second channel. When the point feature data passes through the second channel, the updated output of the attention mechanism of each layer and the updated output of the attention mechanism of the corresponding layer of the first channel that is in the same layer as the next layer are spliced and input to the next layer.

A point cloud reconstruction module 330 is used to perform the following. The updated output of the attention mechanism of the bottommost layer of the second channel is converted into point cloud coordinates to obtain a point cloud result of each view, and an intersection of the point cloud result of each view is taken to characterize a target object after point cloud reconstruction.

In the embodiment, for the specific implementation of each module, please refer to the description in Embodiment 1, which will not be repeated here.

Persons skilled in the art can easily understand that the above descriptions are only preferred embodiments of the disclosure and are not intended to limit the disclosure. Any modifications, equivalent replacements, and improvements made within the spirit and principles of the disclosure should be included within the protection scope of the disclosure.

What is claimed is:

1. A point cloud reconstruction method based on a pyramid transformer, characterized by comprising:
    obtaining a plurality of views of a target object from different perspectives, and processing each of the views to obtain corresponding point feature data;
    inputting the point feature data into a pyramid network, wherein the pyramid network comprises a first channel from bottom to top and a second channel from top to bottom, the first channel and the second channel have a same number of layers, and a number of sampling points in a same layer is the same; sampling an input point feature of each layer, updating a point feature of an invisible part of a current view using point features of visible parts of other views based on a sampled point feature of each of the views, and obtaining correlation between updated point features in each of the views using a transformer to obtain an updated output of an attention mechanism;
    when the point feature data passes through the first channel, inputting the updated output of the attention mechanism of each layer to a next layer until the updated output of the attention mechanism of a topmost layer of the first channel is input to a topmost layer of the second channel;
    when the point feature data passes through the second channel, splicing and inputting the updated output of the attention mechanism of each layer and the updated output of the attention mechanism of a corresponding layer of the first channel that is in a same layer as the next layer to the next layer; and
    converting the updated output of the attention mechanism of a bottommost layer of the second channel into point cloud coordinates to obtain a point cloud result of each of the views, and taking an intersection of the point cloud result of each of the views to characterize a target object after point cloud reconstruction.

2. The point cloud reconstruction method according to claim 1, wherein the processing of each of the views to obtain the corresponding point feature data comprises:
    performing image coding on each of the views according to a neural network algorithm to obtain a feature map corresponding to each of the views;
    determining local feature data of each of the views according to a preset camera intrinsic parameter matrix and a preset random point cloud of each of the views;
    processing the preset random point cloud according to the neural network algorithm to obtain global feature data of each of the views; and
    splicing the local feature data and the global feature data of each of the views to obtain the point feature data of each of the views.

3. The point cloud reconstruction method according to claim 2, wherein the determining of the local feature data of each of the views according to the preset camera intrinsic parameter matrix and the preset random point cloud of each of the views comprises:
    projecting the preset random point cloud of each of the views onto the corresponding feature map according to the preset camera intrinsic parameter matrix to obtain coordinate data of the preset random point cloud on the corresponding feature map; and
    determining a feature formed by the coordinate data on the corresponding feature map as the local feature data of each of the views.

4. The point cloud reconstruction method according to claim 2, wherein the processing of the preset random point cloud according to the neural network algorithm to obtain the global feature data of each of the views comprises:
    processing the preset random point cloud through the neural network algorithm to obtain an initial feature point corresponding to the preset random point cloud;
    converting a mean and a variance of the initial feature point into a mean and a variance of each corresponding feature map; and
    determining the mean and the variance of the feature map as the corresponding global feature data of each of the views.

5. The point cloud reconstruction method according to claim 1, wherein the sampling of the input point feature comprises: adaptively sampling the input point feature through learning a weighted matrix.

6. The point cloud reconstruction method according to claim 1, wherein before converting the updated output of the attention mechanism of the bottommost layer of the second channel into the point cloud coordinates, the point cloud reconstruction method further comprises:

converting the updated output of the attention mechanism of each layer of the second channel into the point cloud coordinates to obtain a point cloud reconstruction result of a corresponding layer; performing parameter adjustment on each layer of the second channel based on a loss function of the corresponding layer, and obtaining an updated output of an optimized attention mechanism of each layer of the second channel;

after splicing and inputting the updated output of the optimized attention mechanism of each layer of the second channel and the updated output of the attention mechanism of the corresponding layer of the first channel that is in the same layer as the next layer to the next layer, obtaining the updated output of the optimized attention mechanism of the next layer of the second channel until the updated output of the optimized attention mechanism of the bottommost layer of the second channel is obtained.

7. A point cloud reconstruction apparatus based on a pyramid transformer, characterized by comprising:

a point feature obtaining module, used to obtain a plurality of views of a target object from different perspectives, and process each of the views to obtain corresponding point feature data;

a point feature updating module, used to input the point feature data into a pyramid network, wherein the pyramid network comprises a first channel from bottom to top and a second channel from top to bottom, the first channel and the second channel have a same number of layers, and a number of sampling points in a same layer is the same; sample an input point feature of each layer, update a point feature of an invisible part of a current view using point features of visible parts of other views based on a sampled point feature of each of the views, and obtain correlation between updated point features in each of the views using a transformer to obtain an updated output of an attention mechanism; when the point feature data passes through the first channel, input the updated output of the attention mechanism of each layer to a next layer until the updated output of the attention mechanism of a topmost layer of the first channel is input to a topmost layer of the second channel; when the point feature data passes through the second channel, splice and input the updated output of the attention mechanism of each layer and the updated output of the attention mechanism of a corresponding layer of the first channel that is in a same layer as the next layer to the next layer; and a point cloud reconstruction module, used to convert the updated output of the attention mechanism of a bottommost layer of the second channel into point cloud coordinates to obtain a point cloud result of each of the views, and take an intersection of the point cloud result of each of the views to characterize a target object after point cloud reconstruction.

8. An electronic device, characterized by comprising: a memory and at least one processor, wherein the memory stores a computer executable command;

the at least one processor executes the computer executable command stored in the memory, so that the at least one processor executes the point cloud reconstruction method according to claim 1.

9. A non-transitory computer-readable storage medium, storing a computer executable command, wherein when a processor executes the computer executable command, the point cloud reconstruction method according to claim 1 is implemented.

* * * * *